May 27, 1952   G. L. N. MEYER   2,597,943
FILLER VALVE WITH AUTOMATIC AND EMERGENCY CUTOFF
Filed Oct. 19, 1945   4 Sheets-Sheet 1

Inventor:
George L. N. Meyer
By: Eugene H. Simpson
Attorney

May 27, 1952 G. L. N. MEYER 2,597,943
FILLER VALVE WITH ATUOMATIC AND EMERGENCY CUTOFF
Filed Oct. 19, 1945 4 Sheets-Sheet 3

Inventor:
George L. N. Meyer
By Eugene H. Simpson
Attorney

May 27, 1952    G. L. N. MEYER    2,597,943
FILLER VALVE WITH ATUOMATIC AND EMERGENCY CUTOFF
Filed Oct. 19, 1945    4 Sheets-Sheet 4

Inventor:
George L. N. Meyer
By: Eugene N. Simpson
Attorney

Patented May 27, 1952

2,597,943

UNITED STATES PATENT OFFICE 2,597,943

FILLER VALVE WITH AUTOMATIC AND EMERGENCY CUTOFF

George L. N. Meyer, Milwaukee, Wis.

Application October 19, 1945, Serial No. 623,240

13 Claims. (Cl. 226—115)

This invention relates to valves and more particularly to a counter-pressure filler valve.

In counter-pressure bottle fillers it sometimes happens that a bottle enters the filler stirrup off center, and when raised toward filling position contacts the depending vent stem and raises the valve. In such fillers, raising the filler valve with no bottle in position under the valve permits the beverage to flow out over the machine and not only wastes the beverage but necessitates some cleaning of the machine.

One object of the invention is to provide a filler valve, having a vent stem projecting therebelow, which valve will not open in the event the vent tube is accidentally raised.

Another object is to provide a filler valve which will remain closed under all circumstances until a predetermined counter-pressure is attained below the valve.

A further object is to provide a bottle filler valve which will eliminate the necessity of stopping and cleaning the machine during operation.

A further object is to provide a self-sealing valve for bottle filling machines.

A further object is to provide a bottle filler valve which will not waste the beverage.

Further objects of the invention will become apparent upon considering the following specification, which, when taken in conjunction with the accompanying drawings, illustrates a preferred form of the invention.

Figure 1:
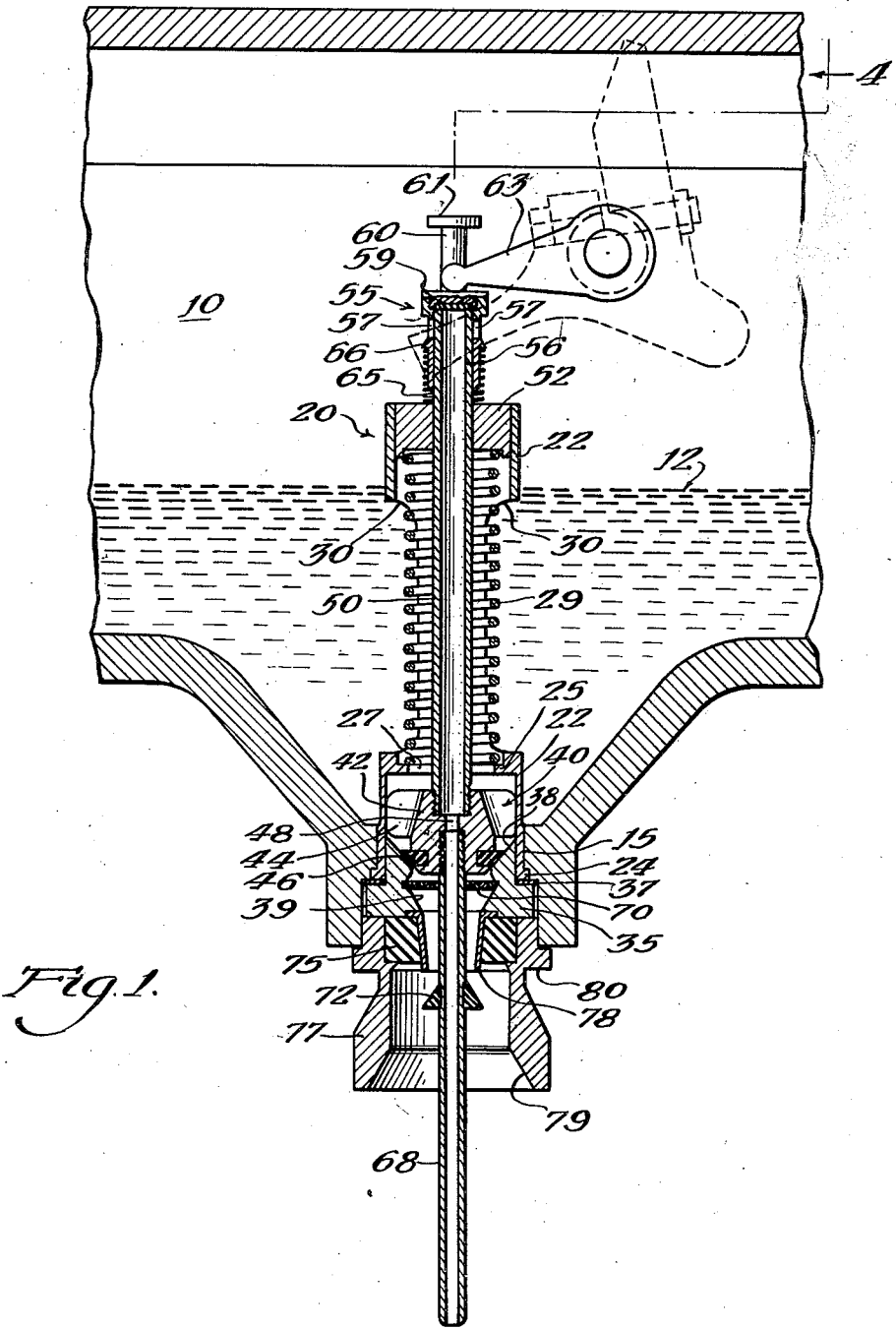
Fig. 1 is a cross-sectional elevational view through a filler bowl and filler valve, showing both the liquid valve and the counter-pressure valves closed.
Figure 2:
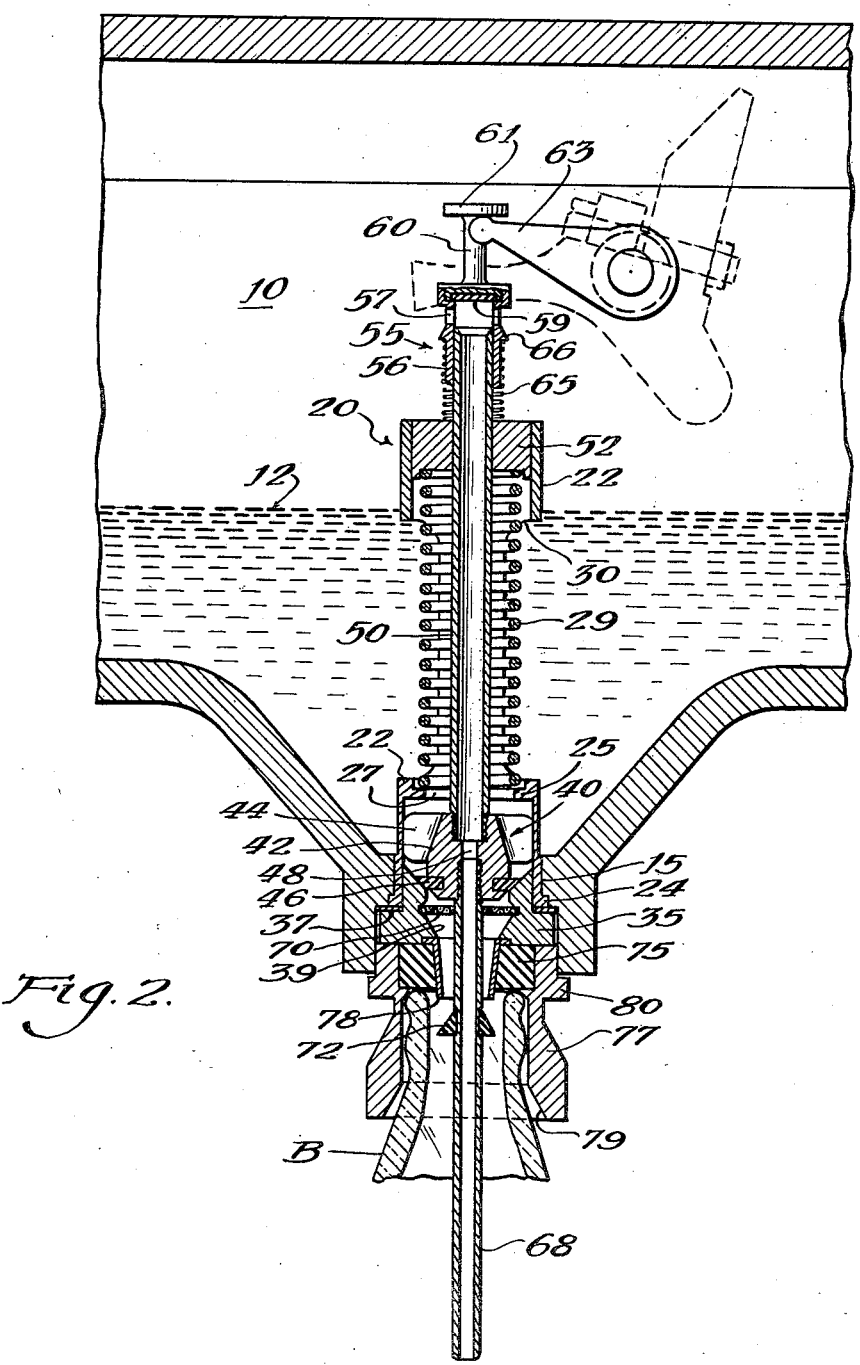
Fig. 2 is a view similar to Fig. 1, but with the counter-pressure valve open and the liquid valve shut.
Figure 3:
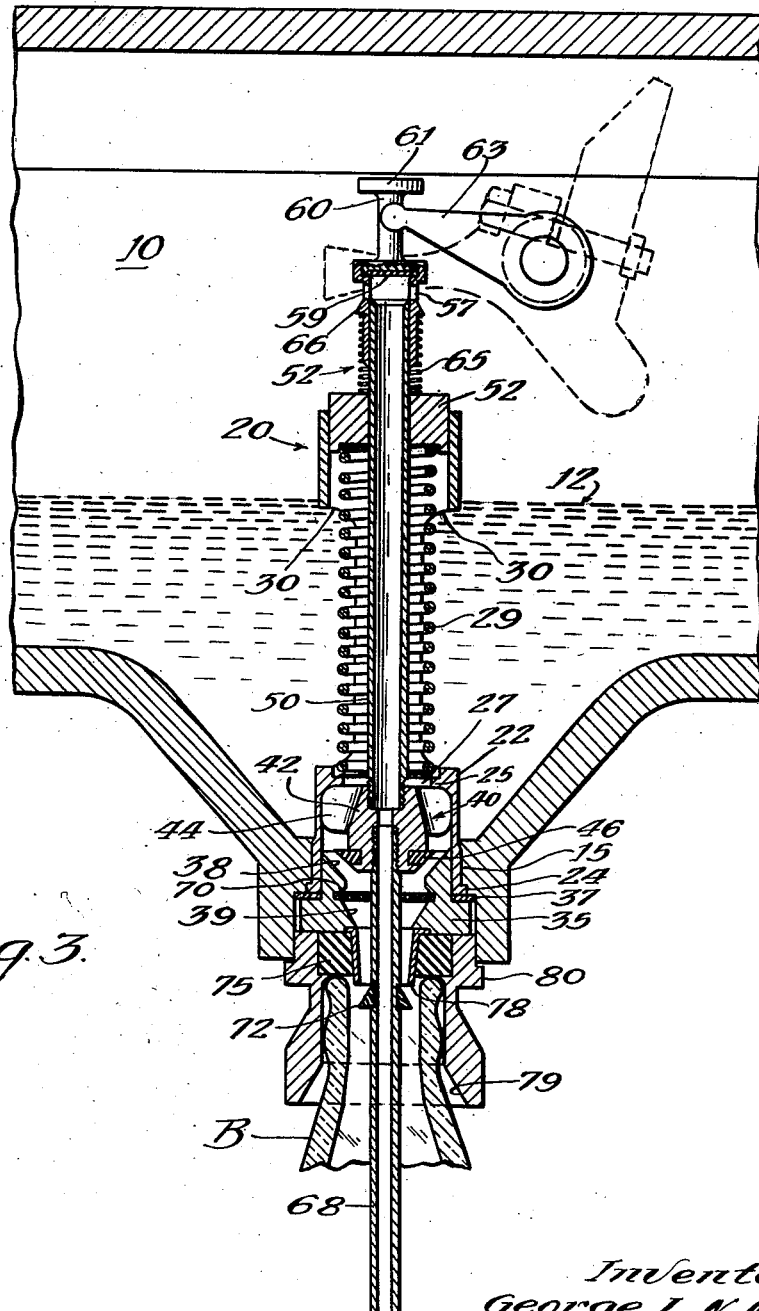
Fig. 3 is a view similar to Figs. 1 and 2 but with both the liquid and counter-pressure valves open.

Referring to the drawings, the filling machine bowl 10 is adapted to receive a beverage 12 in the lower part of the bowl, the upper part of the bowl being filled with gas under pressure which forms a source of counter-pressure through the filler valve to the bottle.

The bowl 10 has a plurality of openings 15 (only one of which is shown) spaced about the periphery thereof, which receive filler valves, generally designated 20.

The valves 20 each have a valve cage 22, which is mounted in the opening 15, with a collar 24 on the lower end of the cage abutting a shoulder in the opening 15 to retain the cage in the opening.

The cage 22 is provided with an annular flange 25 surrounding an aperture 27, which flange forms a lower abutment for a spring 29 to be described below.

The cage has apertures 30 extending through the side walls of the cage above the flange 25, and may have apertures 32 (Fig. 4) through the walls of the cage below the flange, the apertures 30 and 32 forming passages for the liquid from the bowl 10 into the valve.

A valve seating ring 35 is mounted in the lower part of the aperture 15 and serves to hold the valve cage in place with the collar 24, a gasket or rubber sealing ring, 37, preventing leakage of liquid past the cage 22.

The valve seating ring 35 has a conical valve seat 38 which surrounds a passageway 39 and seats a valve generally designated 40. The valve 40 comprises a valve body 42 having a spider or guide wings 44 which contact the inside of the cage 22 to guide the valve in a vertical axial movement relative to the seat 38. The valve body 42 has a horizontal circular aperture around the lower part thereof which receives a flexible valve closure member 46.

Figure 4:
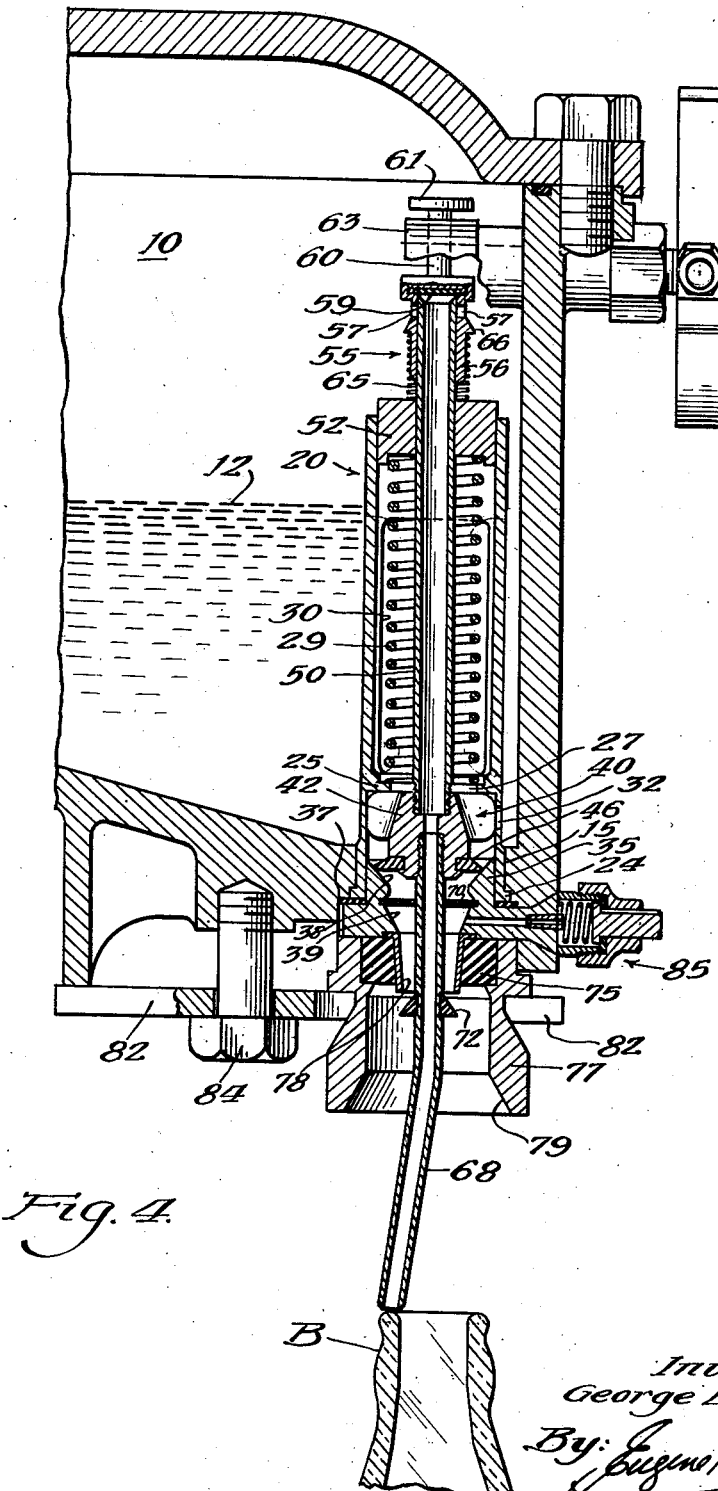
Fig. 4 is a cross-section on the line 4—4 of Fig. 1, but showing the liquid valve being urged into open position by a misaligned bottle.

The valve closure member 46 is preferably made of rubber and is tapered toward its outer periphery to form a feather edge to conform with the shape of the conical valve seat 38. The closure 46 is made of highly flexible material, such as a soft rubber, so that it will not open the passageway 39 in the event the valve body is accidentally raised, but so that the feather edge will bend down under the pressure of the liquid to maintain the passageway sealed, as shown in Fig. 4.

The valve body 42 has a vertical aperture 48 therethrough. A tube 50 is screw threaded into the upper end of the aperture 48 and extends upwardly through the cage 22, and above the maximum level of the liquid in the bowl 10.

The tube 50 has a guide block 52 fixed thereon, which guide block has a sliding fit in the upper open end of the cage 22. The guide block serves both as a guide for the upper end of the valve 40 and as a base against which the spring 29 abuts. The spring 29, being in compression between the flange 25 and the guide block 52 constantly urges the valve 40 into open position.

The upper end of the tube 50 is provided with a valve 55 which is opened and closed mechanically, but may be closed automatically by fluid pressure upon reduction of pressure within the bottle. The valve 55 has a tubular sleeve 56 which has a free sliding fit over the tube 50 with ports 57 to admit gas from the top of the bowl 10 to the tube 50. A valve seat 59 is made preferably of rubber and is secured in the top of the sleeve 56 and seats on the top of the tube 50 to stop flow of gas down the tube.

The upper end of the tubular sleeve is provided with an extension rod 60 which has a head 61 which is adapted to actuate the valve upon movement of a cam follower 63.

A spring 65 s mounted on the tubular sleeve 56 between the top of the guide block 52 and a shoulder 66 on the tubular sleeve 56, below the ports 57. The spring 66 urges the valve 55 into open position, the valve normally remaining closed when there is no bottle beneath the valve 20 due to the pressure within the bowl 10.

A vent tube 68 is screw threaded in the lower end of the opening 48 in the valve body 42, and projects downwardly through a foraminous element or screen 70, which is mounted in the aperture 39, and into the bottle. The vent tube has a spreader element 72 mounted thereon which deflects the liquid flowing down the vent tube 68 on to the interior of the neck of the bottle.

A bottle sealing ring 75 is mounted in a centering ring 77. The sealing ring may be made of rubber and has a central opening which carries a tube 78 which forms a continuation of the opening 39 in the valve seat 35.

The centering ring 77 has a cam surface 79 which guides the bottle into a central position under the valve 20 so that it may be filled properly.

An annular shoulder 80 is formed on the exterior of the ring 77. The shoulder 80 receives the bifurcated end of a clamp 82. The clamp 82 is tightened on the machine by a bolt 84 and serves to retain the entire valve structure and centering ring in place in the opening 15.

As seen in Fig. 4, a snifter valve 85 is cam actuated to relieve pressure within the bottle after the valves 40 and 55 have both been closed.

*Operation*

In operation, the filler bowl 10 is filled with a liquid beverage to a level below the top of the tube 50 and gas is delivered to the bowl above the liquid under a predetermined pressure. At this time both valves 40 and 55 are closed.

The filler may then be started and bottles B fed into the stirrups (not shown) by a star wheel (not shown). The stirrups lift the bottles into engagement with the valves 20. As the stirrup lifts the bottle the end of the vent tube 68 enters the neck of the bottle, and the bottle is accurately centered under the valve by the conical taper 79 on the centering ring 77.

The bottle is raised by the stirrup until it is in sealing engagement with the sealing ring 75. When this occurs the filler bowl 10 has rotated to a point where a cam (not shown) actuates the cam follower 63 to raise the valve 55 allowing the gas pressure within the upper part of the bowl 10 to pass through the opening 57 and down the tubes 50 and 68 and into the bottle B.

After the follower 63 has opened the valve 55 a cam (not shown) returns the follower 63 to a neutral position permitting the valve 55, which is held open by the spring 65, to be closed by the pressure of the gas in the event no bottle is in position under the valve 20, or if the bottle should burst.

When the counter-pressure in the bottle B equals the pressure in the bowl 10, the spring 29 overcomes the liquid pressure on the valve 40, raising the guide block 52 which raises the valve 40, permitting the liquid 12 to flow downward past the valve 40, through the passage 39, through the screen 70 and the tube 78 and off the spreader 72 onto the inner surface of the neck of the bottle B.

As the beverage flows into the bottle, gas from the top of the bottle escapes through the tubes 68 and 50 and through the valve 55 into the top of the bowl 10.

When the beverage rises above the bottom of the tube 68, it seals off the tube 68 to the further escape of gas, causing the gas pressure to rise. Upon a rise in pressure the screen 70 acts to stop further flow of the beverage through the aperture 39 due to the surface tension of the liquid acting on the fine mesh of the screen. Thus the flow of beverage is stopped when the level of liquid in the bottle is slightly above the bottom of the vent tube 68.

The filler continues to rotate on its axis and passes a third cam (not shown) which actuates the follower 63 downwardly closing both the valves 40 and 55.

A fourth cam (not shown) opens the snifter valve, after the follower 63 closes both valves 40 and 55, to vent the gas pressure in the top of the bottle to the atmosphere. The bottle is then removed from the machine and conveyed to the capper for sealing.

Should the bottle B burst the fluid pressure on the valves would cause both the valves 40 and 55 to close.

In the event the bottle becomes misaligned on the stirrup and forces the valve body 42 upwardly, as shown in Fig. 4, the rubber valve closure 46 will bend downwardly under the pressure of the liquid 12 and keep the valve 40 from opening, thus preventing the accidental discharge of beverage through the valve 40.

It is to be understood that the herein shown embodiment is to be construed merely as a preferred example of the invention, and that various changes in size, shape and arrangement of parts may be made without departing from the spirit of the invention or the scope of the subjoined claims.

That which is claimed as new and is desired to be secured by Letters Patent is:

1. In a counter-pressure filler valve having a gas control valve adapted to control the flow of counter-pressure to a container, a liquid valve adapted to open upon the attaining of a predetermined counter-pressure therebeneath, said liquid valve comprising a cage, a valve seat at one end of said cage, a valve body mounted for movement toward and away from said seat, and a valve closure member carried by said valve body to govern the flow of liquid through said valve, said valve closure member being movable with respect to the valve body so that said closure remains seated on said valve seat upon movement of the valve body without the presence of sufficient counter-pressure beneath said liquid valve.

2. In a counter-pressure filler valve having a gas control valve adapted to control the flow of counter-pressure to a container, a liquid valve adapted to open upon the attaining of a predetermined counter-pressure therebeneath, said liquid valve comprising a cage, a conical valve seat at one end of said cage, a valve body mounted for movement toward and away from said seat, and a valve closure member carried by said valve body to govern the flow of liquid through said valve, said valve closure member being movable with respect to the valve body so that said closure remains seated on said conical seat upon movement of the valve body without the presence of sufficient counter-pressure beneath said liquid valve.

3. In a counter-pressure filler valve having a gas control valve adapted to control the flow of counter-pressure to a container, a liquid valve adapted to open upon the attaining of a predetermined counter-pressure therebeneath, said liquid valve comprising a cage, a valve seat at one end of said cage, a valve body mounted for movement toward and away from said seat, and a flexible valve closure member having a separately movable feather edge carried by said valve body to govern the flow of liquid through said valve the feather edge of said valve closure member flexing to remain seated on said valve seat upon movement of the valve body without the presence of sufficient counter-pressure beneath said liquid valve.

4. In a counter-pressure filler valve having a gas control valve adapted to control the flow of counter-pressure to a container, a liquid valve adapted to open upon the attaining of a predetermined counter-pressure therebeneath, said liquid valve comprising a cage, a conical valve seat at one end of said cage, a valve body mounted for movement toward and away from said seat, and a flexible valve closure member having a separately movable feather edge carried by said valve body to govern the flow of liquid through said valve, the feather edge of said valve closure member flexing to remain seated on said conical seat upon movement of the valve body without the presence of sufficient counter-pressure beneath said liquid valve.

5. In a counter-pressure filler valve having a gas control valve adapted to control the flow of counter-pressure to a container, a liquid valve adapted to open upon the attaining of a predetermined counter-pressure therebeneath, said liquid valve comprising a cage, a valve seat at one end of said cage, a valve body mounted for movement toward and away from said seat, and a flexible valve closure member carried by said valve body to govern the flow of liquid through said valve, said valve closure member flexing downwardly to remain seated on said seat upon movement of the valve body upwardly without the presence of sufficient counter-pressure beneath the said liquid valve.

6. In a counter-pressure filler valve having a gas control valve adapted to control the flow of counter-pressure to a container, a liquid valve adapted to open upon the attaining of a predetermined counter-pressure therebeneath, said liquid valve comprising a cage, a conical valve seat at one end of said cage, a valve body mounted for movement toward and away from said seat, and a flexible valve closure member carried by said valve body to govern the flow of liquid through said valve, said valve closure member flexing downwardly to remain seated on said conical seat upon movement of the valve body upwardly without the presence of sufficient counter-pressure beneath the said liquid valve.

7. In a counter-pressure filler valve having a gas control valve adapted to control the flow of counter-pressure to a container, a liquid valve adapted to open upon the attaining of a predetermined counter-pressure therebeneath, said liquid valve comprising a cage, a valve seat at one end of said cage, a valve body mounted for movement toward and away from said seat, and a flexible valve closure member having a feather edge, carried by said valve body to govern the flow of liquid through said valve, the feather edge of said valve closure member flexing downwardly to remain seated on said seat upon movement of the valve body upwardly without the presence of sufficient counter-pressure beneath the said liquid valve.

8. In a counter-pressure filler valve having a gas control valve adapted to control the flow of counter-pressure to a container, a liquid valve adapted to open upon the attaining of a predetermined counter-pressure therebeneath, said liquid valve comprising a cage, a conical valve seat at one end of said cage, a valve body mounted for movement toward and away from said seat, and a flexible valve closure member having a feather edge, carried by said valve body to govern the flow of liquid through said valve, the feather edge of said valve closure member flexing downwardly to remain seated on said conical valve seat upon movement of the valve body upwardly without the presence of sufficient counter-pressure beneath the said liquid valve.

9. In a counter-pressure filled valve having a gas control valve adapted to control the flow of counter-pressure to a container, a liquid valve adapted to open upon the attaining of a predetermined counter-pressure therebeneath, said liquid valve comprising a cage, a valve seat at one end of said cage, a valve body having an annular aperture around the periphery thereof, said body being mounted for movement toward and away from said seat, and an annular rubber disc in said aperture to form a valve closure member and govern the flow of liquid through said valve, said disc remaining seated on said valve seat upon movement of the valve body without the presence of sufficient counter-pressure beneath said liquid valve.

10. In a counter-pressure filler valve having a gas control valve adapted to control the flow of counter-pressure to a container, a liquid valve adapted to open upon the attaining of a predetermined counter-pressure therebeneath, said liquid valve comprising a cage, a valve seat at one end of said cage, a valve body having an annular aperture around the periphery thereof, said body being mounted for movement toward and away from said seat, and an annular rubber disc, having a feather edge, in said aperture to form a valve closure member and govern the flow of liquid through said valve, the feather edge of said disc flexing under pressure to remain seated on said valve seat upon movement of the valve body without the presence of sufficient counter-pressure beneath said liquid valve.

11. In a counter-pressure filler valve having a gas control valve adapted to control the flow of counter-pressure to a container, a liquid valve adapted to open upon the attaining of a predetermined counter-pressure therebeneath, said liquid valve comprising a cage, a conical valve seat at one end of said cage, a valve body having an annular aperture around the periphery thereof, said body being mounted for movement toward and away from said seat, and an annular rubber disc having the outer edge feathered parallel to the conical seat mounted in said aperture to form a valve closure member and govern the flow of liquid through said valve, the feather edge of said disc flexing under pressure to remain seated on said valve seat upon movement of the valve body without the presence of sufficient counter-pressure beneath said liquid valve.

12. In a counter-pressure filler valve having a gas control valve adapted to control the flow of counter-pressure gas to the container to be filled, a liquid valve adapted to open normally upon the attaining of a predetermined counter-pressure therebeneath, said liquid valve comprising a valve seat, a valve body mounted for movement toward and away from said seat, and a valve closure member carried by said valve body to govern the flow of liquid through said valve, said valve closure member being movable with respect to the valve body so that said closure remains seated upon said valve seat upon movement of the valve body without the presence of sufficient counter-pressure beneath said liquid valve.

13. In a counter-pressure filler valve adapted to control the flow of counter-pressure gas and liquid from a filler bowl to a container to be filled, a valve cage, having a liquid conducting passage at the lower end thereof, a valve seat surrounding said passage, a gas conducting tube mounted in the upper end of the cage and extending above the level of liquid in the bowl, a valve body having a passage for gas therethrough mounted on said tube and adapted to conduct gas from said tube through said valve to the container, valve means to control the flow of gas through said tube and said valve body, and a flexible valve closure member carried by said valve body and adapted to seat on said seat to control the flow of liquid through said liquid conducting passage, said valve closure member flexing downwardly to remain seated on said seat upon movement of the valve body upwardly without the presence of sufficient counter-pressure beneath the liquid valve.

GEORGE L. N. MEYER.

REFERENCES CITED

The following references are of record in the file of this patent:

UNITED STATES PATENTS

| Number | Name | Date |
|---|---|---|
| 1,072,771 | Pittaluga | Sept. 9, 1913 |
| 1,140,169 | La Porte | May 18, 1915 |
| 2,063,326 | Meyer | Dec. 8, 1936 |